United States Patent [19]

Mordorski

[11] Patent Number: 4,693,827
[45] Date of Patent: Sep. 15, 1987

[54] PROCESS FOR PROTECTION OF BIOLOGICAL NITRIFICATION SYSTEMS

[75] Inventor: Carol J. Mordorski, Minneapolis, Minn.

[73] Assignee: Zimpro Inc., Rothschild, Wis.

[21] Appl. No.: 841,636

[22] Filed: Mar. 20, 1986

[51] Int. Cl.$^4$ ............................ C02F 3/30; C02F 3/08
[52] U.S. Cl. ................................... 210/614; 210/605; 210/616; 210/630; 210/903; 210/610
[58] Field of Search ............... 210/903, 605, 610, 611, 210/614, 630, 631

[56] References Cited

U.S. PATENT DOCUMENTS

| | | | |
|---|---|---|---|
| 3,764,523 | 10/1973 | Stankewich, Jr. | 210/5 |
| 3,957,632 | 5/1976 | Knopp et al. | 210/5 |
| 4,160,724 | 7/1979 | Laughton | 210/7 |
| 4,183,809 | 1/1980 | Klapwijk et al. | 210/8 |
| 4,338,196 | 7/1982 | Mayerle | 210/610 |
| 4,487,697 | 12/1984 | Böhnke et al. | 210/630 |
| 4,537,682 | 8/1985 | Wong-Chong | 210/611 |

FOREIGN PATENT DOCUMENTS

| | | | |
|---|---|---|---|
| 142177 | 6/1980 | Fed. Rep. of Germany | 210/610 |
| 53-130860 | 11/1978 | Japan | 210/903 |
| 54-104655 | 8/1979 | Japan | 210/631 |
| 60-241998 | 11/1985 | Japan | 210/631 |
| 80-00300 | 8/1981 | Netherlands | 210/903 |

*Primary Examiner*—Benoit Castel
*Attorney, Agent, or Firm*—Allen H. Erickson

[57] ABSTRACT

A method for accelerating the startup of biological nitrification systems for wastewater treatment and preventing or reducing the effects of toxic or inhibitory materials or excursions of pH, temperature or dissolved oxygen upon nitrifying organisms. A rapidly metabolized soluble or miscible organic material containing little or no nitrogen is added to the carbon-consuming step of the process. Heterotrophic organisms consume the added material together with soluble ammonia to generate additional organisms. The soluble ammonia concentration in the wastewater is reduced to a nontoxic, less toxic, or less inhibitory level.

7 Claims, 4 Drawing Figures

PROCESS FOR PROTECTION OF BIOLOGICAL NITRIFICATION SYSTEMS

BACKGROUND OF THE INVENTION

1. Field of the Invention

This invention relates generally to the enhancement of biological nitrification processes for the removal of ammonia nitrogen from wastewater, and more particularly to the protection of such processes from ammonia toxicity.

2. Information Disclosure Statement

Nitrification is an oxidative process for converting ammonia nitrogen to nitrite and nitrate. The reactions are commonly carried out biologically to remove nitrogen from wastewater before disposal or reuse.

Organisms responsible for oxidation of carbonaceous organic material are ubiquitous and generally heterotrophic organisms such as zooglea, pseudomonas and chromobacterium which require organic carbon as a food and energy source.

On the other hand, organisms responsible for nitrification are classed as chemotrophic because of their ability to fix inorganic carbon ($CO_2$) as their carbon source. Nitrosomonas and Nitrobacter represent the limited groups of microorganisms responsible for nitrification, and which obtain energy from oxidation of ammonia nitrogen to nitrite and nitrate by the following two-step pathway:

Step 1: $NH_4^+ + 1.5\ O_2 \rightarrow NO_2^- + 2\ H^+ + H_2O$ (Nitrosomonas)

Step 2: $NO_2^- + 0.5\ O_2 \rightarrow NO_3^-$ (Nitrobacter)

Nitrification may be carried out in suspended growth systems or attached growth treatment schemes. Nitrification may be accomplished in one or more separate stages provided for that purpose, or nitrification can be performed together with organic carbon removal in the same vessel or vessels. Although considerable nitrification is accomplished in well-operated activated sludge systems treating municipal wastewaters, stringent removal requirements often require a much higher degree of nitrogen removal than is achieved with conventional systems for organic carbon removal.

All biological treatment systems, including nitrification systems, are susceptible to upsets caused by sudden changes in temperature, pH, dissolved oxygen concentration or the presence of toxic substances. Death of part of the population leaves the same amount of substrate that must be removed by a smaller number or organisms. The remaining organisms must reproduce to replace the organisms lost in the upset. Therefore, system recovery is dependent on the specific growth rate (reproduction rate) of the microorganisms. Nitrifying bacteria are strictly autotrophic, and have a much slower specific growth rate than heterotrophic bacteria responsible for degradation of organic material. The slow growth rate decreases the ability of the nitrifiers to recover from system shocks, such as pH or temperature excursions, low dissolved oxygen (DO) levels, or the presence of toxic materials. Ammonia nitrogen (particularly as free ammonia) is itself inhibitory or toxic to nitrification bacteria. When a shock of any kind disables the nitrifiers, the ammonia nitrogen in the wastewater often rises to levels which are inhibitory or toxic. These elevated ammonia nitrogen levels hinder the recovery of the nitrifying cultures; high removal rates of nitrogen may not be achieved for weeks or months following an upset.

Ammonia nitrogen is thought to inhibit nitrifier growth or activity at concentrations as low as 100 to 200 mg/l. The severity of inhibition increases as the ammonia nitrogen concentration increases. Domestic wastewaters typically contain 10 to 50 mg/l of ammonia nitrogen. During upset conditions, ammonia released by lysing biomass may increase the level dramatically. Many industrial wastewaters contain considerably higher ammonia nitrogen concentrations, as high as several g/l or higher. Start-up of nitrification systems to treat such wastewaters may be protracted for several months or longer. Thus, the overall nitrogen removal efficiency is severely hampered.

In suspended growth systems, biological upsets are often accompanied by washout of a substantial portion of the microorganisms from the system due to difficulties in solids separation. Heterotrophic bacteria recover much more rapidly than chemotrophic nitrifiers due to their higher specific growth rate.

A small portion of wastewater nitrogen is assimilated into new cellular material. Typically, viable activated sludge contains 6–14 percent nitrogen as percent of solids. The actual quantity of nitrogen removed from the wastewater into cellular material depends on the quantity of biological solids removed (wasted) from the system. Where the solids residence time in the system is relatively long, the fraction of ammonia nitrogen removed by cell assimilation is very small.

Generally, conditions which cause an upset of the nitrifying bacteria often upset the carbon-consuming heterotrophic microorganisms as well. Typically, when such an upset occurs, steps are taken to prevent solids washout, in order to maintain as high a population of microorganisms as possible under the adverse conditions. A negative effect of this procedure is that a sizeable fraction of the bacterial population, deactivated by the shock conditions, lyse and release additional ammonia nitrogen into the wastewater through enhanced endogenous respiration. Thus, a step taken to restore the carbon-consuming bacteria to a "healthy" condition contributes to the toxicity or inhibitory effects of the wastewater on the nitrifying organisms.

Systems where both carbonaceous material and ammonia are simultaneously removed in the same oxygenated vessel are exemplified by the activated sludge process. The conditions for optimal removal rates of the two types of contaminant differ, however, so that generally the system is designed and controlled for removal of carbonaceous matter, with nitrogen removal being a secondary consideration. Ammonia nitrogen removal is generally low, often less than 35 percent, and large fluctuations are typical.

A two stage biological system employing a carbon removal step followed by an ammonia removal step is shown in Stankewich, Jr. U.S. Pat. No. 3,764,523. A different biological sludge is maintained within each stage by separation and circulation of each sludge. Pure oxygen is used to maintain relatively high concentrations of dissolved oxygen in both steps. A small quantity of wastewater carbonaceous BOD is allowed to enter the second stage to provide sufficient carbonaceous material for production of nitrifying organisms.

Laughton U.S. Pat. No. 4,160,724 shows a wastewater treatment system with two biological steps using the same sludge comprising a mixture of carbon consuming organisms, nitrifying organisms and denitrifying organisms. The first step is controlled as an anoxic stage for denitrification and partial removal of carbonaceous matter, and the second stage is controlled at a higher dissolved oxygen concentration to enhance nitrification. A high recycle rate ensures that the nitrified wastewater from the second stage is subjected to denitrifying conditions.

A similar flowsheet is shown in Klapwijk et al U.S. Pat. No. 4,183,809, with the additional feature whereby a portion of the wastewater bypasses the first (denitrification) stage and is routed to the second (nitrification) stage before passing to the first stage.

The two-stage nitrification-denitrification process of Knopp et al U.S. Pat. No. 3,957,632 uses powdered activated carbon in admixture with biomass in both stages. The benefits included maintenance of a high concentration of nitrifying organisms in the first (nitrification) stage and a high concentration of denitrifying organisms in the second (denitrification) stage.

Simultaneous nitrification and denitrification in a single stage is shown in Wong-Chong U.S. Pat. No. 4,537,682. The invention not only includes control of sludge wastage rate, hydraulic residence time, dissolved oxygen requirement, sludge mixing rate, pH and temperature, but also the control of the influent $BOD_5/N$ ratio at a level of at least 1.7–2.8 to satisfy denitrification requirements. From a practical standpoint, such control is extremely difficult to achieve.

SUMMARY OF THE INVENTION

The primary objective of the present invention is the enhanced removal of ammonia nitrogen from wastewaters. A further objective is the protection of nitrifying microorganisms from upsets caused by pH or temperature shock, oxygen depletion, solids washout, or the inflow of toxic or inhibitory substances, including ammonia. A further objective is rapid recovery from the effects of such upset conditions.

Another objective is rapid startup of nitrification systems to quickly achieve steady-state high removals of ammonia nitrogen.

As described and claimed herein, the present invention is a method for enhancing biological nitrogen removal in an aerobic nitrification treatment system. In such a treatment system, wastewater is contacted with an oxygen containing gas and heterotropic carbon-consuming organisms to remove organic matter. Simultaneously or subsequently, the wastewater is contacted with oxygen containing gas and chemotrophic nitrifying organisms to convert ammonia in the wastewater to nitrite and/or nitrate. In such a system, nitrifying organisms are subject to loss of nitrifying activity resulting from fluctuations in pH, temperature or dissolved oxygen, or the presence of toxic or inhibitory materials including soluble ammonia.

The loss of nitrification is reduced or eliminated by the process of the present invention, comprising the continuous or intermittent addition of a rapidly metabolized soluble or miscible organic material containing less than 5 percent nitrogen to the wastewater in the organic matter reducing step, whereby the added organic matter and a portion of the ammonia in the wastewater generate additional nitrogen containing organisms. The ammonia concentration in the wastewater in the nitrification step is reduced to a non-toxic or less-toxic concentration where inhibition of nitrification by the substrate ammonia itself is eliminated or ameliorated, but not so low that insufficient ammonia nitrogen remains as substrate for the nitrifying organisms.

The organic substance may be added to the wastewater stream just prior to or directly to the stage which removes carbonaceous materials from the wastewater.

The addition of the rapidly metabolized soluble or miscible organic material may be discontinued upon recovery of proper steady state conditions for nitrification, or upon recovery of nitrification to the desired level.

BRIEF DESCRIPTION OF THE DRAWINGS

The present invention is more easily understood from the accompanying drawings which are given by way of illustration only, and thus are not limitative of the present invention, and wherein.

DESCRIPTION OF THE PREFERRED EMBODIMENTS

As described above, this invention is a method for enhancing the biological nitrification process in a wastewater treatment system. The deleterious effects resulting from operating excursions or the introduction of toxic or inhibitory materials are eliminated or reduced in severity, and high ammonia nitrogen removals are achieved.

Figure 1:
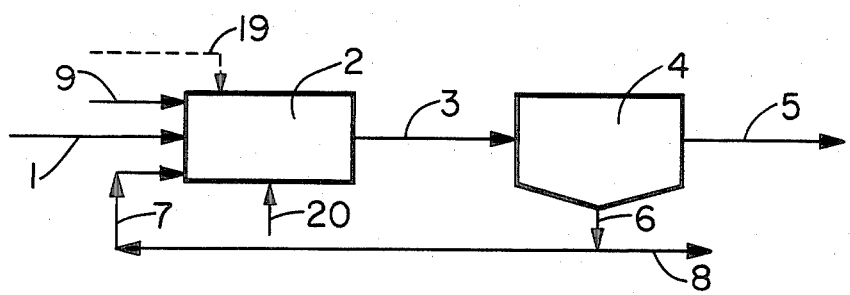
FIG. 1 is a flow diagram showing the invention as applied to a single stage process removing both carbonaceous matter and ammonia nitrogen from wastewater.

The drawing of FIG. 1 illustrates the broad concept of this invention as applied to a single stage biological wastewater treatment system in which organic matter is degraded and consumed by heterotrophic microorganisms, and ammonia nitrogen is nitrified by chemotrophic microorganisms such as Nitrobacter and Nitrosomonas.

In FIG. 1, wastewater 1 which contains ammonia is introduced into aerobic nitrification treatment step 2. Wastewater 1 is contacted with an oxygen containing gas 20 and heterotrophic carbon-consuming organisms to remove organic matter. Coexistent and coextensive within step 2 are chemotrophic nitrifying organisms for converting ammonia in the wastewater 1 to nitrite and/or nitrate. Both the heterotrophic organisms and chemotrophic organisms are continuously cultivated in nitrification step 2, having originally entered the step in wastewater 1 or as "seed sludge" from another treatment vessel or process.

Nitrifying organisms, of which Nitrosomonas and Nitrobacter species are the most common, are sensitive to many factors, including high levels of ammonia nitrogen, free—or soluble—ammonia in particular. Such organisms are subject to loss of nitrifying activity resulting from fluctuations in pH, temperature or dissolved oxygen, or the presence of toxic or inhibitory materials including soluble ammonia.

In FIG. 1 nitrified mixed liquor 3 comprising heterocyclic and chemotrophic nitrifying organisms suspended in wastewater pass to a solids removal step 4 which typically seperates a major portion of the organisms and other suspended matter from the wastewater. Treated wastewater 5 is discharged to a further treatment step such as denitrification, or final disposal. The biological sludge 6 is recycled as recycle stream 7 to nitrification step 2. Waste biological sludge 8 is discharged at a rate to balance the biological solids in recycle stream 7 and sludge production in step 2, maintaining the desired biological sludge concentration for proper treatment of wastewater 1 in nitrification step 2.

Sudden operational changes, or the introduction of toxic or inhibitory materials may result in less nitrification. The ammonia nitrogen concentration in the wastewater may rise to a level where it is itself inhibitory or toxic to the nitrifying organisms.

To counteract the effects upon nitrification of pH, temperature or dissolved oxygen excursions, or the presence of toxic or inhibitory materials, including soluble ammonia, a rapidly metabolized soluble or miscible organic material 9 containing less than 5 percent nitrogen is added to the wastewater 1 in the organic matter consuming step 2. In FIG. 1, the organic matter consuming step and the nitrification step are the same, both steps occurring simultaneously and coextensively within the same medium in a single aeration vessel. The added organic material 9 is rapidly consumed by the organic matter consuming, i.e., carbon consuming organisms. Organic matter is incorporated into cellular matter by both reproduction and cell growth. Soluble ammonia nitrogen is also removed from the wastewater by the carbon consuming organisms and incorporated into cellular matter. The C:H:O:N ratio of bacterial cellular material is typically about 52:6:26:12, but the nitrogen fraction is considerably higher in a rapidly growing culture and under other conditions. It has been found that the ratio of ammonia nitrogen removed by cellular incorporation to the Biochemical Oxygen Demand ($BOD_5$) removed typically ranges from 0.02 to 0.60, depending on the type of wastewater, the particular organic material added, and other factors. The organic material 9 may be added at a concentration based on this ratio and the quantity of ammonia nitrogen to be removed. Sufficient ammonia nitrogen is removed to reduce the concentration to a non-toxic or less toxic or less inhibitory value.

The ease with which some compounds are consumed is related to the numbers and types of enzymes required to complete the particular chemical breakdown reactions. A compound whose breakdown requires only a few readily-formed enzymes will reasonably be consumed much more quickly than one which undergoes a long series of complex enzymatic reactions. It may be further postulated that in the latter case, there is more opportunity for toxic or inhibitory materials to halt the breakdown reactions short of completion.

The types of chemical compounds which are most effective as supplements for the purposes of this invention are simple compounds which fall into the following classes:

(a) short chain aliphatic alcohols such as methanol or ethanol;
(b) short chain organic acids;
(c) aromatic alcohols such as simple phenols and cresols;
(d) aromatics including benzene, toluene and xylenes; and
(e) short chain carbohydrates such as glucose.

The supplement need not be a pure compound, but for economic reasons is preferably a waste product or impure material containing a high concentration of one or more of the indicated compounds.

The presence of nitrogen in the added material 9 is detrimental to the working of this invention, particularly if present as free ammonia or a form which is quickly converted to free ammonia by biological action. Some nitrogen may be tolerated, however, although it may necessitate a higher addition rate of material 9. Generally, nitrogen in the material 9 should comprise less than 5 percent by weight of the total organic content of the material. Preferably, nitrogen comprises less than 3 percent by weight of the organic content. Most preferably, the rapidly-metabolized organic material is essentially nitrogen-free.

The uptake of ammonia nitrogen by the organic material consuming heterotrophic organisms reduces the ammonia concentration in wastewater 1 to a non-toxic, less toxic or less inhibitory concentration.

It is believed that the inhibitory or toxic effects of free ammonia gradually increase as the concentration increases. Such toxicity or inhibition is also affected by other factors including the particular operating conditions of temperature, dissolved oxygen, pH, or so forth. Thus, for example, in one system the ammonia nitrogen concentration must be reduced to 30 mg/l to enable rapid nitrification recovery. In another system, the same recovery rate may be achieved at an ammonia nitrogen concentration of 100 mg/l. The optimum level for recovery in a particular system may be determined by trial and error. Adding an excess of supplemental material 9 will not harm the nitrification system, unless sufficient oxygen to maintain the required dissolved oxygen level is not provided, or insufficient free ammonia substrate remains for the nitrifiers over an extended time period.

The nitrifying organisms multiply much more slowly than the hetrocyclic organisms, and the addition of the supplemental organic material does not, per se, significantly affect nitrifier growth. The reduction of free ammonia in the wastewater due to incorporation into heterotrophic organism cellular matter lessens or eliminates the inhibition or toxicity of free ammonia to the nitrification functions.

If the system shock is temporary, the addition of organic substance 9 may be stopped as soon as the shock is passed. However, if the shock is caused by a higher ammonia loading which continues over a period of several days or more, the organic substance may be gradually reduced as the nitrifiers multiply to accomodate the higher load.

An offshoot of the activated sludge process is widely used to achieve enhanced removals of organic matter and nitrogen. In this embodiment, shown in FIG. 1, powdered activated carbon (PAC) 19 is introduced into the aeration step 2. The PAC particles act as adsorbents and as attachment centers for biological cells. High concentrations of organisms, both heterocyclic and nitrifying, may be maintained in the aeration step 2.

Such a process, known in the industry as the PACT ® process, achieves greater freedom from the effects of toxicity or inhibition, particularly in organic matter removal. However, it has been found that during very highly stressful conditions, nitrification may deteriorate in spite of the presence of PAC. The present invention may be advantageously applied to the PACT® process to achieve a consistent high level of nitrification during periods of stress.

The beneficial effects of this invention upon ammonia nitrogen removal from wastewater occur in two ways. First, the ammonia level is almost immediately lowered, and may be maintained at a reduced level until nitrifying organisms recover from the upset and resume full nitrification. Second, the recovery period is considerably shortened. Thus, full recovery may be achieved while adding the supplementary material for only a short time period, and much less attention is required by the treatment system.

A particular control method which may be applied to the process of FIG. 1 includes the establishment of a predetermined degree of nitrification which represents an acceptable level of soluble ammonia in the biotreated wastewater. This acceptable ammonia level may be imposed by a state or federal governmental regulatory agency for example, or may be a lower level.

The actual concentration of soluble ammonia is measured in the biotreated wastewater in mixed liquor 3 or treated wastewater 5.

When the determined concentration of soluble ammonia is greater than the acceptable level, rapidly-metabolized soluble or miscible organic material 9 containing less than 5 percent nitrogen is introduced into wastewater 1 within the aeration step 2 where carbon-consuming organisms oxidize organic matter and nitrifiers oxidize ammonia to nitrite and nitrate. Additional heterotrophic carbon-consuming organisms are generated, incorporating ammonia from the wastewater to reduce the soluble ammonia concentration in the wastewater to an acceptable level and prevent toxic or inhibitory elevated levels of ammonia from forming in the process.

Figure 2:
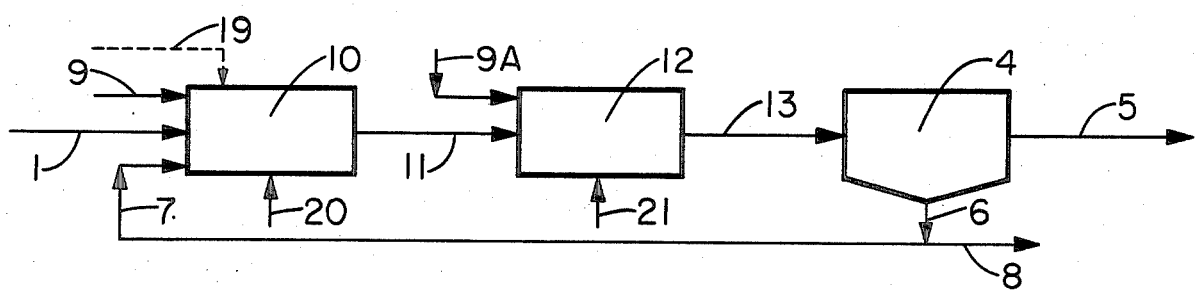
FIG. 2 is a flow diagram illustrating application of the instant invention to a two-stage process in which carbonaceous matter is removed in the first stage and ammonia nitrogen in the second stage.

In the embodiment of FIG. 2 the concept is applied to a two stage aerobic biological treatment system. Wastewater 1 containing both a biodegradable organic component and an ammonia nitrogen component first flows to the first stage, a biological treatment step 10 containing heterotrophic organisms that will remove biodegradable organic substances and a portion of the ammonia nitrogen as a nutrient. Oxygen-containing gas 20 provides the oxygen requirements for the heterotrophic carbon-consuming organisms. Mixed liquor 11 from organic matter removal step 10 passes to a second biological treatment step 12 in which remaining ammonia nitrogen in the mixed liquor 11 is removed by nitrifying organisms. Oxygen-containing gas 21 is supplied. Nitrified mixed liquor 13 is passed to solids removal step 4. Treated wastewater 5 from which solids have been separated is discharged to a further treatment step or to the environment. A portion 7 of biological sludge 6 is recycled to first stage 10 to provide the necessary heterotrophic and nitrifying organisms. The remaining biological sludge 8 is treated further and discharged.

Loss of nitrifying activity resulting from fluctuations in pH, temperature or dissolved oxygen, or the presence of toxic or inhibitory materials including soluble ammonia may be avoided or ameliorated by the method of this invention. A soluble or miscible organic material 9 containing less than 5 percent nitrogen is added to wastewater 1 within or prior to the first biological step 10. Alternatively, a stream 9A comprising a portion or all of the organic material is added to second biological step 12. The material 9 or 9A is rapidly metabolized by heterotrophic carbon-consuming organisms which also consume a portion of the soluble ammonia to generate additional nitrogen containing organisms. Thus the excessively high ammonia concentration in the wastewater is reduced to a non-toxic or less toxic or less inhibitory level.

In one embodiment of this invention, powdered activated carbon or other adsorbent 19 is added to one of the biological treatment steps 10 or 12. While the adsorbent is shown in FIG. 2 as being added to first stage 10, it may be added at any point provided it passes through steps 10 and 12. Normally, adsorbent 19 is recycled with sludge 7 and a portion in sludge 8 may be regenerated and recycled into adsorbent stream 19.

Figure 3:
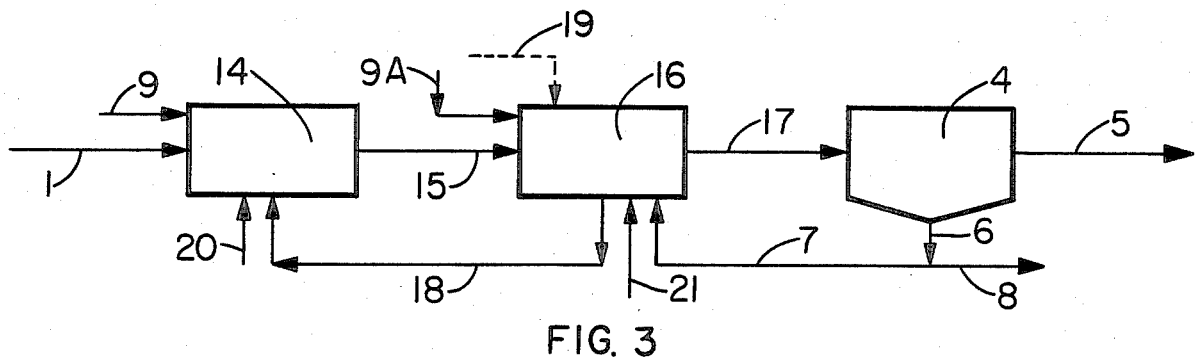
FIG. 3 is a flow diagram showing an application of the present invention to a two-stage system similar to that of FIG. 2 but with additional flow streams and conditions to accomplish increased denitrification in the first stage.

Like FIG. 2, FIG. 3 illustrates a two stage biological treatment system which includes nitrification. The embodiment differs from that of FIG. 2 in that the first biological treatment stage is an organic matter removal step 14 operated at an anoxic dissolved oxygen level to achieve considerable denitrification. Wastewater 1 enters the first step 14 where organic matter is removed and nitrate and/or nitrite nitrogen is converted to nitrogen gas. Air or oxygen 20 is added to maintain the desired anoxic condition.

Mixed liquor 15 from the first step 14 passes to the second biological treatment step 16, where nitrifying organisms convert soluble ammonia to nitrate and/or nitrite. Air or oxygen containing gas 21 is supplied to maintain an oxidizing but anoxic environment. A considerable portion 18 of the second stage mixed liquor is recycled to the first stage for further denitrification. Mixed liquor 17 from the second stage 16 passes to a solids removal step 4, providing a treated wastewater 5 which is low in concentration of organic matter, suspended solids, soluble ammonia, nitrite and nitrate. A portion 7 of biological sludge 6 is recycled to the second stage 16 and the remainder 8 is wasted to the environment or further treatment. A portion of the biological sludge may also be recycled to first stage 14.

In a further embodiment of FIG. 3, a powdered adsorbent 19 such as activated carbon may be added to one of the treatment steps to be recycled through both biological treatment systems.

The system of FIG. 3 is subject to upset because of fluctuations in pH, temperature or dissolved oxygen, or the presence of toxic or inhibitory materials including soluble ammonia. Although the degradation of organic matter, and denitrification may both suffer from the upset, the present invention is primarily concerned with the nitrifying organisms, whose inhibition may be more long lasting and difficult to overcome. A rapidly metabolized soluble or miscible organic material 9 containing less than 5 percent nitrogen is added to first stage 14. In an alternative arrangement, a portion or all of the organic material may be added as stream 9A to the second stage 16. The material added to the second stage is metabolized very rapidly, and very little is recycled to first stage 14 or is present in the treated wastewater 5.

The rapid uptake of added organic material 9 and/or 9A almost entirely within the stage to which it is added enables accurate prediction of ammonia uptake within each stage. Additional oxygen requirements due to added material may also be accurately calculated, so that oxygen depletion may be prevented. A calculated quantity of organic material 9 and/or 9A may be added to generate nitrogen-containing organisms and reduce the soluble ammonia concentration in the wastewater in the nitrifying step 16 to a non-toxic or less toxic or less inhibitory concentration.

Figure 4:
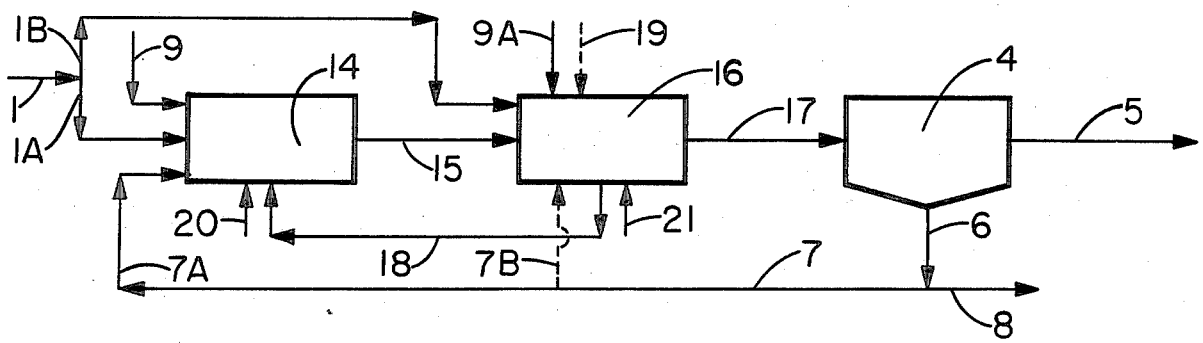
FIG. 4 is a flow diagram showing the present invention as applied to a two-stage system similar to that of FIG. 3 but including wastewater bypass.

Like the system of FIG. 3, the wastewater treatment system of FIG. 4 includes a denitrification step 14 followed by a nitrification step 16, with a portion 18 of nitrified mixed liquor recycled from nitrification step 16 to the denitrification step 14. The system differs from that of FIG. 3 in several ways. First, influent wastewater 1 is split into two streams, wastewater 1A directed to the first stage, an organic matter removal step 14 and wastewater 1B directed to a second stage, a nitrification step 16. Denitrification is also accomplished in first step 14. Secondly, recycled biological sludge 7 from solids removal step 4 is largely recycled to first step 14 as stream 7A but a portion may be recycled as stream 7B to second step 16 to achieve the desired mixed liquor solids concentrations in both biological steps. As in FIG. 3, both biological steps are oxygenated with oxygen containing gas 20 and 21, respectively. A powdered adsorbent 19 such as activated carbon may be added to the second step 16, if desired.

The addition of rapidly metabolized organic material 9 or 9A to the first or second biological treatment step 14 or 16, respectively, results in rapid uptake of ammonia present in the wastewater. Thus the ammonia concentration in the nitrification step may be reduced to a non-toxic or less toxic or less inhibitory concentration. Recovery of the nitrifying organisms from the loss of nitrifying activity is rapidly achieved.

In each of the foregoing embodiments where rapidly metabolized material 9 is added to a stage in which denitrification is occuring, a portion of material 9 may act as an oxygen acceptor to enhance the denitrification process. The quantity of oxygen acceptor material is generally but a small portion of the total quantity of added material 9. Thus, the addition of another material as an oxygen acceptor is unnecessary. In any case, the added material 9 is nearly completely consumed in the biological stage to which it is added, provided viable carbon-consuming organisms are present in a high concentration, that is, at least 1 g/l.

Use of the present invention is not limited to preventing deleterious effects of operating excursions or inhibitory substances upon an operating nitrification system. It may also be utilized to shorten the start-up period of a newly initiated nitrification system. Addition of supplement 9 results in rapid proliferation of the heterotrophic organisms which lowers the wastewater free nitrogen to a non-inhibitory or less-inhibitory concentration. The particular nitrification system may have a single biological treatment stage, or several stages.

In the start-up of nitrification systems, including those of FIGS. 1-4, effective nitrification of wastewater ammonia may be difficult to initiate. Studies conducted on certain wastewaters have sometimes resulted in little or no nitrification even after months of operation. One reason for such a prolonged startup period is a high concentration of soluble ammonia in the wastewater. The excess concentration is toxic or inhibitory to reproduction and/or activity of nitrifying organisms. The improvement of this invention includes a method for accelerating the start-up of nitrification processes. The method comprises introduction into the wastewater of a rapidly-metabolized soluble or miscible organic material 9 or 9A containing less than 5 percent nitrogen. The material is introduced into the wastewater within the nitrification process or into a prior aerobic biotreatment step for carbonaceous material removal. The organic material 9 or 9A is taken up by existing heterotrophic organisms, generating additional organisms. Ammonia in the wastewater 1 is incorporated into the new organisms, to reduce the ammonia concentration in wastewater 1 to a non-toxic or less-toxic or less inhibitory level. The nitrifying organisms are thus permitted to reproduce and carry out nitrification without the toxic or inhibitory effect of ammonia.

The characteristics of added material 9 or 9A used during startup of nitrification systems are as previously described. Preferably, the material contains less than 3 percent nitrogen, and most preferably is essentially nitrogen-free.

The quantity of rapidly-metabolized material to be added depends upon the extent that a critical toxic or inhibitory ammonia level is exceeded. The critical ammonia level varies from system to system, is dependent on wastewater characteristics, and may be determined experimentally. Generally, the ratio of added material 9 or 9A to the excess toxic or inhibitory ammonia concentration in the wastewater is 10–400. Rapid uptake of ammonia nitrogen by heterotrophic organisms reduces the soluble ammonia to a concentration which is non-toxic or less-toxic or less-inhibitory to the nitrifying organisms.

Whether applied to the startup of a nitrification system for treating high ammonia wastewaters, or to a nitrification system whose nitrifying organisms are disabled by toxic or inhibitory substances in the wastewater or by excursions of operating variables, the invention greatly shortens the startup or recovery period, and reduces the effluent ammonia concentration during the startup or recovery period.

Although the invention is described above as applied to certain particular biological flow schemes, it is not limited thereto. The invention may be applied to any biological nitrification system for treating wastewater which also includes a carbon-consuming step by heterotrophic organisms.

The following example is merely illustrative of the process of the invention; it is no way exhaustive of the invention or its embodiments.

EXAMPLE

A two stage, activated sludge biological system was treating a synthetic fuels wastewater containing 600 mg/l $BOD_5$, 270 mg/l total phenols and 150 mg/l $NH_3$—N. The flow scheme was according to FIG. 2, where carbonaceous matter in wastewater 1 was largely consumed in first step 10 and the wastewater passed to second step 12 where ammonia was nitrified. Each stage was completely mixed. Biological sludge containing both heterotrophic carbon-consuming organisms and nitrifying organisms was recycled from solids removal step 4 to the first biological step 10.

During normal operation 99 percent of the phenols were removed in the first stage. Approximately 36 mg/l $NH_3$—N of the 150 mg/l $NH_3$—N feed was consumed as nutrient in the first step 10 passing 114 mg/l $NH_3$—N on to the second stage 12 as food for nitrifiers, where it was removed to levels of <1 mg/l. When nitrification was upset due to pH shock, allowing 30 mg/l ammonia to be discharged from the second stage 12, 2660 mg/l phenol was added to the first stage 10 to temporarily decrease the amount of ammonia passed on to the second stage. The ratio of added phenol to excess ammonia was 2660/30, or 89. Within 18 hours of beginning the phenol addition, first stage effluent ammonia was reduced to 7.7 mg/l. When the shock had passed, the phenol addition was gradually decreased so that the nitrifiers could resume ammonia removal. Recovery of nitrification was achieved in several days. Without such treatment, recovery took several weeks.

I claim:

1. In a process for biotreating wastewater to remove carbonaceous materials and soluble ammonia therefrom to produce a biotreated wastewater, wherein said wastewater is contacted with an oxygen-containing gas and a biomass containing heterotrophic carbon-consuming organisms to oxidize carbonaceous materials and nitrifying organisms to oxidize ammonia to nitrite and nitrate, said process being subject to deterioration in degree of nitrification resulting from fluctuations in pH, temperature or dissolved oxygen, or the presence of toxic materials, including soluble ammonia in said wastewater, wherein the improvement is a method to deter said deterioration and to enhance recovery of nitrification, comprising the steps of:
   (a) establishing a predetermined degree of nitrification representing an acceptable level of soluble ammonia in said biotreated wastewater;
   (b) determining the concentration of soluble ammonia in said biotreated wastewater;
   (c) when the determined concentration of soluble ammonia in said biotreated wastewater is greater than said acceptable level, introducing into said wastewater in said process, or into a prior carbonaceous material removal step, a rapidly-metabolized soluble or miscible organic material containing less than 5 percent nitrogen wherein the ratio of said organic material to the ammonia concentration in excess of said acceptable level in the biotreated wastewater is 10–400, to generate additional heterotrophic organisms which incorporate therein ammonia from said wastewater to reduce the ammonia concentration in said wastewater to an acceptable level and prevent toxic or inhibitory elevated levels of ammonia from forming in said process.

2. The method according to claim 1, wherein said rapidly-metabolized material contains less than 3 percent nitrogen by weight.

3. The method according to claim 1, wherein said rapidly-metabolized material is essentially nitrogen-free.

4. The method according to claim 1, wherein said rapidly-metabolized material comprises one or more of short chain aliphatic alcohols, short chain organic acids, aromatic alcohols, aromatics and short chain carbohydrates.

5. The method according to claim 1, wherein said rapidly-metabolized material comprises one or more of phenol, benzene, toluene, methanol, ethanol, acetic acid, formic acid, acrolein, and acetaldehyde.

6. The method according to claim 1, wherein said rapidly-metabolized material is a waste product.

7. The method according to claim 1, wherein said wastewater is contacted with an oxygen-containing gas and a biomass containing heterotrophic carbon-consuming organisms in the presence of powdered activated carbon.

* * * * *

UNITED STATES PATENT AND TRADEMARK OFFICE
CERTIFICATE OF CORRECTION

PATENT NO.   :   4,693,827
DATED        :   Sep. 15, 1987
INVENTOR(S)  :   Carol J. Mordorski It is certified that error appears in the above-identified patent and that said Letters Patent is hereby corrected as shown below:

Column 1, line 51: "or" should read -- of --.

Column 3, line 47: "heterotropic" should read -- heterotrophic --.

Column 5, line 3: "heterocyclic" should read -- heterotrophic --.

Column 6, lines 44 and 64: "heterocyclic" should read -- heterotrophic --.

Column 6, line 63: "attachement" should read -- attachment --.

Signed and Sealed this

Twenty-second Day of March, 1988

Attest:

DONALD J. QUIGG

*Attesting Officer*     *Commissioner of Patents and Trademarks*